(12) United States Patent
Pham et al.

(10) Patent No.: US 6,865,223 B1
(45) Date of Patent: Mar. 8, 2005

(54) EQUALIZER ADAPTER FOR A PULSE AMPLITUDE MODULATION RECEIVER

(75) Inventors: Duy Pham, Phoenixville, PA (US); Anthony Eugene Zortea, Pipersville, PA (US)

(73) Assignee: 3Com Corporation, Santa Clara, CA (US)

( * ) Notice: Subject to any disclaimer, the term of this patent is extended or adjusted under 35 U.S.C. 154(b) by 796 days.

(21) Appl. No.: 09/777,083

(22) Filed: Feb. 5, 2001

(51) Int. Cl.[7] .............................................. H03K 5/159
(52) U.S. Cl. ..................................................... 375/229
(58) Field of Search ................................ 375/229, 230, 375/233, 232

(56) References Cited

U.S. PATENT DOCUMENTS 6,222,876 B1 * 4/2001 Hirth et al. ................. 375/224
6,437,932 B1 * 8/2002 Prater et al. ................. 360/46

\* cited by examiner

*Primary Examiner*—Chieh M. Fan
*Assistant Examiner*—Kevin Kim
(74) *Attorney, Agent, or Firm*—MIchaelson & Associates; Peter L. Michalson

(57) ABSTRACT

A receiver has an equalizer with plural equalization settings, which compensates for distortion in a received signal, and an adapter for selecting one of those settings which optimally compensates for the distortion. The adapter employs a trial and error procedure for evaluating equalizer performance for each such setting by first observing multiple levels of the incoming signal and defining therefrom valid regions, encompassing each of the multiple levels, and invalid regions. For each setting, the adapter computes first and second metrics respectively consisting of a count of samples within each of the invalid regions, and differences that are less than a predetermined threshold between pairs of samples falling within that valid region. For each setting, the adapter combines the metrics to produce a combined metric. The adapter then compares all of the combined metrics to determine the best metric and chooses the setting corresponding thereto.

29 Claims, 3 Drawing Sheets

EQUALIZER ADAPTER FOR A PULSE AMPLITUDE MODULATION RECEIVER

RELATED APPLICATION

This application contains subject matter related to co-pending, commonly assigned U.S. application Ser. No. 09/777,080, filed concurrently herewith entitled PHASE DETECTOR FOR BAUD RATE-SAMPLED MULTI-STATE SIGNAL RECEIVER.

BACKGROUND OF THE INVENTION

1. Technical Field

The invention is related to signal processing of received signals of the type having a set of allowable states or amplitudes, such as pulse amplitude modulated signals, such as signal processing employing equalization. In a particular application, the invention concerns the adaptive control of an equalizer employed in the processing of multi-state signals.

2. Background Art

Multi-state signals are employed in high speed (e.g., gigabit-per-second) network communications, such as local area networks of computers. While the present invention may find application in processing various types of multi-state signals, such as pulse amplitude modulated signals, phase modulated signals and so forth, the detailed description presented below concerns application of the invention to processing of pulse amplitude modulated signals.

Many high speed computer networks transmit ultra-high frequency signals (gigabit-per-second data) over a coaxial conductor cable. The cable introduces signal distortion, arising from certain characteristics of the cable such as its reactance. Signal distortion also arises in channels that do not employ an electrically conductive cable. Signal processing is employed to correct for such distortion. For example, the signal processing distortion correction may be performed by an equalizer of the type which introduces a certain reactance that compensates for the reactance of the cable. A conventional equalizer suitable for digital signal processing introduces a transfer function whose representation in the complex plane has appropriate poles and zeroes corresponding to the desired reactance, as is well known to the skilled worker. Various reactances may be stored in the equalizer, and one of them is selected at any one time. The problem is that the cable reactance is not known a priori, and therefore the equalizer must have a large number of settings (e.g., reactances) one of which is chosen only after actual testing in the field of the cable. Since the cable characteristics may not be constant and/or the cable may be changed by the user, the choice of equalizer setting must be made periodically during actual use of the network. This is accomplished by adaptive techniques in which the signal distortion is periodically or constantly monitored and the equalizer setting is periodically or constantly adjusted in a manner calculated to minimize the distortion.

Numerous conventional techniques have been employed to carry out such adaptive equalization. Such techniques include recursive algorithms such as a Recursive Least Squares adaptive algorithm and a Least Mean Square adaptive algorithm. A significant problem with such techniques is that these adaptive algorithms are mathematically intensive, involving large numbers of multiply and accumulate steps. Implementing a very large number of multiply operations in a circuit is very expensive and complex, making it difficult to provide such a product on a cost-competitive basis.

Therefore, there is a need to provide adaptive equalization without requiring such a mathematically intensive algorithm or without requiring multiply and accumulate operations.

SUMMARY OF THE INVENTION

The invention is embodied in a receiver that receives a modulated signal having multiple levels. The receiver has an equalizer with plural equalization settings for compensating for distortion in the received signal. The receiver further includes an adapter for selecting one of the plural equalization settings that provides an optimum compensation for the distortion. The adapter employs a trial and error procedure for evaluating the equalizer performance for each one of the equalizer settings by first observing the multiple levels of the incoming signal and defining therefrom valid regions encompassing each of the multiple levels and invalid regions not encompassing the multiple levels. Next, the adapter computes a first metric consisting of a count of samples within each of the invalid regions. It also computes a second metric consisting of the differences that are less than a predetermined threshold between pairs of samples falling within the same valid region. Finally, the adapter combines the first and second metrics to produced a combined metric for said one equalizer setting. The adapter then compares all of the combined metrics to determined the best metric and chooses the equalizer setting corresponding to the best combined metric.

DETAILED DESCRIPTION OF THE INVENTION

Figure 1:
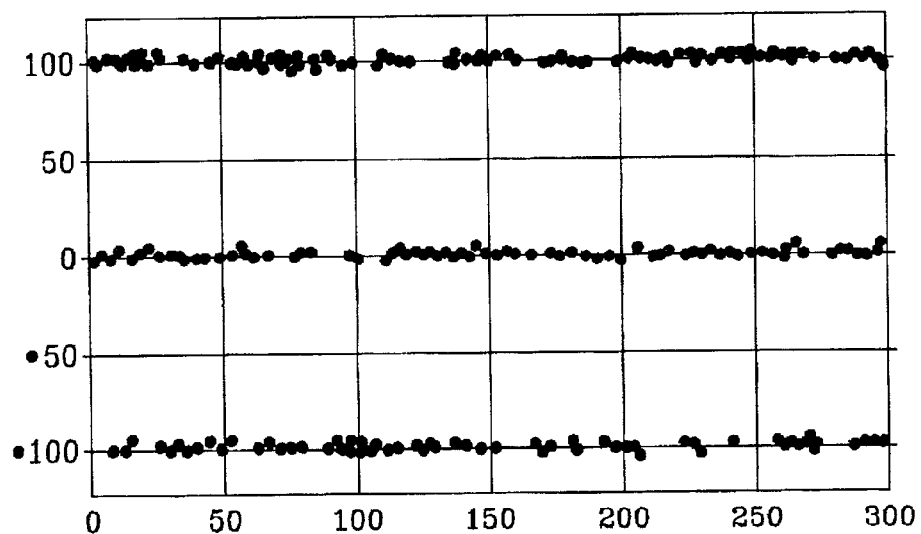
FIG. 1 is a histogram of received 3-level pulse amplitude modulated signal samples transmitted over such a short cable that no distortion is visible.

The invention involves a recognition that in a multi-state signal, distortion causes a significant number of samples of the signal to be detected in unallowed states. For example, in a three-level pulse amplitude modulated signal, a severely distorted signal would appear to the receiver to have a large number of samples of the signal at amplitudes between the allowed levels. Thus, if the three levels are 5 volts, –5 volts and 0 volts (with a tolerance of +0.2 volts), then a severely distorted signal would have a preponderance of samples in the invalid region between +4.8 and +0.2 volts and in the invalid region between –4.8 and –0.2 volts. For example, a sample at 2.5 volts would be in the middle of an invalid region. The correct amplitude of such a sample is one of the two valid levels on either side of the sample, but it is impossible to determine which one. Thus, samples lying between the two valid levels are anomalous, and the information they represent is lost. The closer a sample is to the middle of an invalid region, the more difficult it is to resolve this anomaly and in many cases it is impossible, leading to failure of the communication system. If the appropriate equalizer setting is found that corrects the distortion, then no received samples lie within either invalid region.

In the invention, this fact is exploited to construct a simple way of evaluating each equalizer setting to find the optimum equalizer setting that best removes distortion. During a training period, a received signal is sampled and then each sample is equalized by an equalizer. The equalizer settings are changed in a trial and error procedure to discover the optimum equalizer setting by evaluating the corrected signals as they are produced. The efficacy of each equalizer setting is evaluated from the resulting corrected signal in accordance with the present invention. Specifically, the efficacy of an equalizer setting is evaluated in accordance with the population of samples produced by that equalizer setting lying within the three allowed regions relative to the population of such samples lying outside the allowed regions.

More particularly, the invention involves first determining for a given equalizer setting the number of samples produced by that equalizer setting lying within each one of the allowed regions (for example, within the region between +4.8 and +5.2 volts) and the number of such samples lying within each one of the unallowed region between +4.8 volts and +0.2 volts. The size (tolerance) of the allowed region may be enlarged to provide more rapid convergence. For example, the tolerance may be 10% of the maximum amplitude absolute value, in which case the allowed regions are 4.5 to 5.5 volts, −0.5 to 0.5 volts and −4.5 to −0.5 volts. In this case, the unallowed regions include the region between 0.5 and 4.5 volts and the region between −0.5 and −4.5 volts. The metric here is either the number of samples falling within the unallowed regions or, alternatively, the percentage of all samples falling within the unallowed regions. Such a metric is referred to herein as a "white box" metric. The smaller this metric, the less ambiguity between allowed levels and therefore the better the equalization.

The next determination is a "tightness" metric. This metric involves determining, for each one of the three valid regions, differences between successive samples lying within the one valid region. This computation is made for each sample lying within the one valid region by computing the difference between the sample and the chronologically last sample that fell within the same valid region. Samples falling within another one of the three valid regions are ignored. First order differences are computed separately for each one of the three valid regions. The smaller the first order differences, the less deviation and therefore the less distortion there is in the processed signal. Thus, the tightness metric is a measure of the smallness of the first order differences. A preferred way of computing the tightness metric is to count the number of first order differences that are less than a small percentage, e.g., 5%, of the peak amplitude deviation. In the foregoing example, the number of first order differences less than 0.25 volts is counted. The more first order differences that are 0.25 volts or less, the tighter the distribution of samples within an allowed region and therefore the better the equalization.

In summary, the equalizer setting having the smallest white box metric and the largest tightness metric is the optimum equalizer setting. All equalizer settings are therefore evaluated by determining their white box metric and their tightness metric. Then, in one implementation, the tightness metric is subtracted from the white box metric, and the equalizer having the least metric (least positive or most negative) is deemed to be the best.

A significant advantage of the invention is that very little arithmetic power is required, apart from a few add operations. In comparison, a least means square algorithm or similar recursive algorithm capable of finding an optimum equalizer setting requires a large number of multiply operations and is therefore far more expensive to implement. The present invention only requires an adder capability, and therefore is far less expensive to implement.

FIG. 1 illustrates a histogram of received samples of a three-level pulse amplitude modulated signal with no distortion. The three signal levels are given as percentages of peak amplitude, specifically 100, 0 and −100. In FIG. 1, each signal sample falls exactly on one of the three allowed signal levels.

Figure 2:
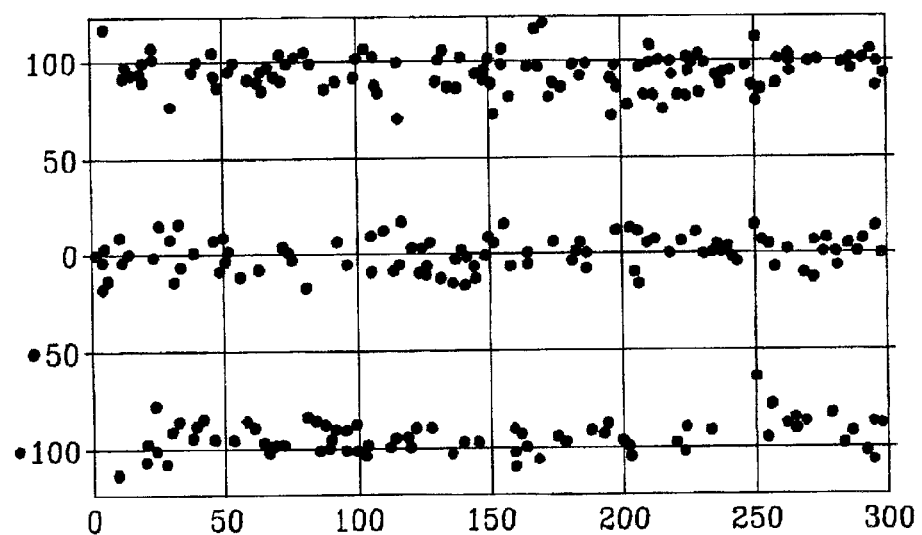
FIG. 2 is a histogram of received 3-level pulse amplitude modulated signal samples transmitted over a very long cable so that significant distortion manifest as deviations from the three valid signal levels is apparent.

FIG. 2 illustrates a histogram of received signal of the same signal in the presence of distortion attributable to the reactance of a long (150 meter) coaxial cable over which the signal was received. FIG. 2 shows that the samples tend to cluster around the three allowed levels, but some of the samples deviate as much as 25% from the nearest allowed level. A 50% deviation is completely anomalous, since at that deviation the sample is equidistant from two allowed levels and therefore it is not known which level is the true level that was transmitted. To avoid such a failure, equalization is necessary to reduce the deviation of the sample population and gain a tighter distribution closer to the ideal case of FIG. 1.

Figure 3:
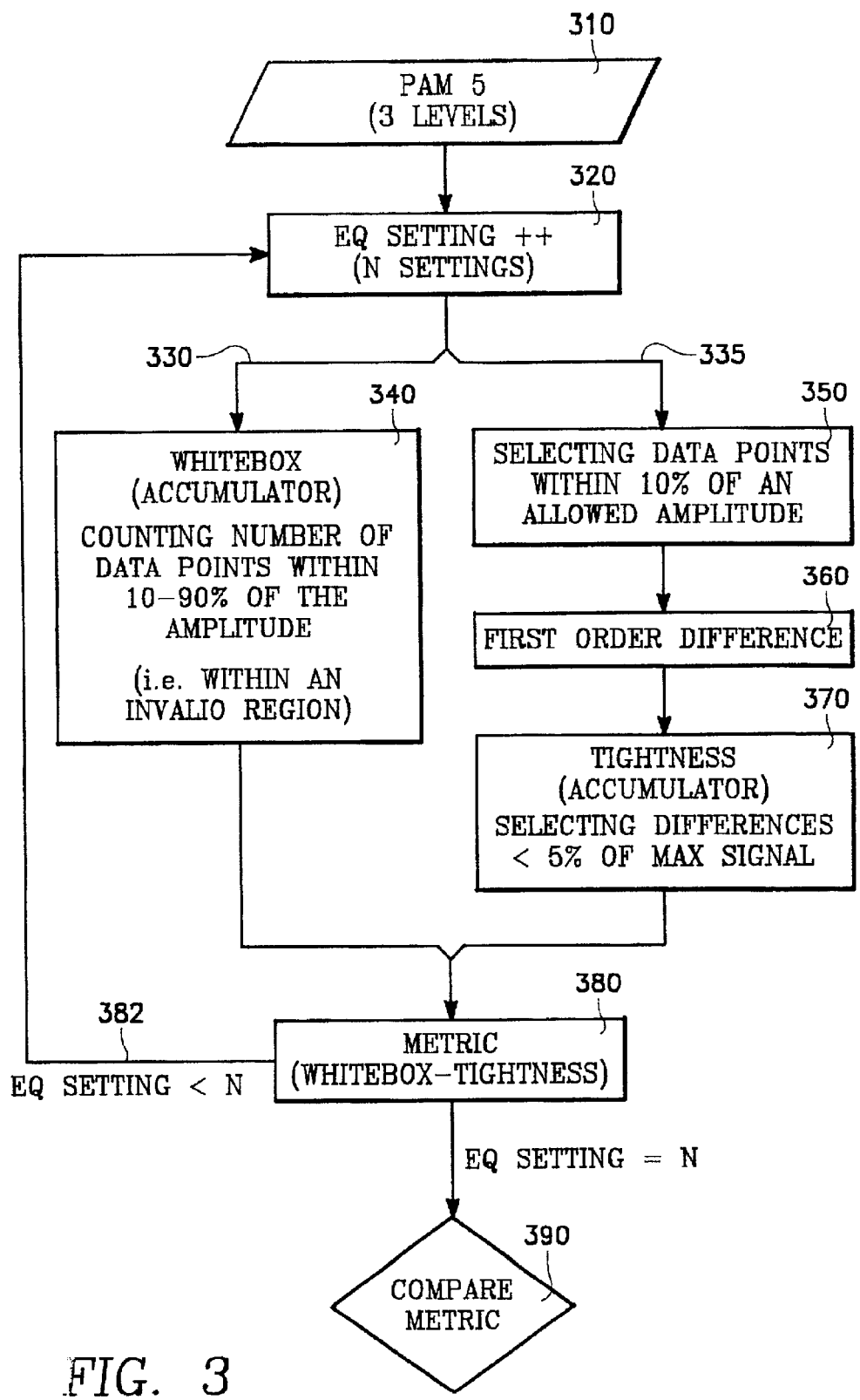
FIG. 3 is a block flow diagram illustrating the operation of a cable feedforward adapter in accordance with a preferred embodiment of the invention.

Referring to FIG. 2, it is seen that a fairly large fraction of the samples deviate more than 10% from the nearest allowed level of 100, 0 or −100. Thus, one practical choice for the white box metric is to define one of the invalid regions as lying between 10 and 90 and the other as lying between −10 and −90. In this case, a practical choice for the tightness metric is to define all first order differences that are 5 or less as satisfying the tightness criteria. FIG. 3 illustrates how these choices would be carried out in implementing an equalizer adapter process of the invention.

Referring to FIG. 3, a stream of 3-level pulse amplitude modulated signal samples is received and their peak positive and peak negative amplitudes are detected to determine the actual amplitudes of the three levels (block 310 of FIG. 3). An equalizer having a number of settings is set to the next equalizer setting in a predetermined sequence of settings (block 320). The process then proceeds along two parallel branches 330, 335. In branch 330, the white box metric is computed by counting the number of samples in each of the two invalid regions, namely the region lying between 10 and 90 and the region lying between −10 and −90, respectively, of the graph of FIG. 2 (block 340). In branch 335, the tightness metric is computed by first identifying the samples lying within each valid region (block 350). The valid regions include the region above +90, the region below −90 and the region between +10 and −10. These regions encompass deviations of 10% from the allowed or valid amplitudes of 100, −100 and 0. Of course, wider regions (e.g., encompassing 15% deviations) or narrower regions (e.g., encompassing 5% deviations) may be chosen. The next step is to compute the amplitude difference between each pair of chronologically successive samples lying within the same valid region (block 360). For this purpose, a pair of samples is considered to be successive even though an intervening sample occurred but fell outside of the region. Such a sample is ignored. Once the differences between each pair of successive samples have been computed for one region, the same computation is performed for another valid region, until all valid regions have been accounted for. Next, for all valid regions, the number of differences not exceeding a threshold amount (such as 5% of the peak amplitude) is counted, the total count being the measure of tightness of the present equalizer setting (block 370). The total metric for the present equalizer setting is then computed (block 380) by combining the whitebox metric of block 340 with the tightness metric of block 370. Preferably, this is done by subtracting the tightness metric from the whitebox metric. Then, if not all equalizer settings have been evaluated (branch 382 of block 380), the next equalizer setting is selected (block 320) and the foregoing process is repeated for the next equalizer setting. Once all equalizer settings have been evaluated (branch 384 of block 380), then the metrics for all of the equalizer settings are compared and the equalizer setting having the best metric is selected (block 390)

The "best" metric is the least positive (or most negative) metric in the preferred embodiment where the metric is defined as the whitebox metric minus the tightness metric. Other definitions could be employed, however. For example, the metric could be the ratio of the whitebox metric to the tightness metric, in which case the smallest metric would be the best.

Figure 4:
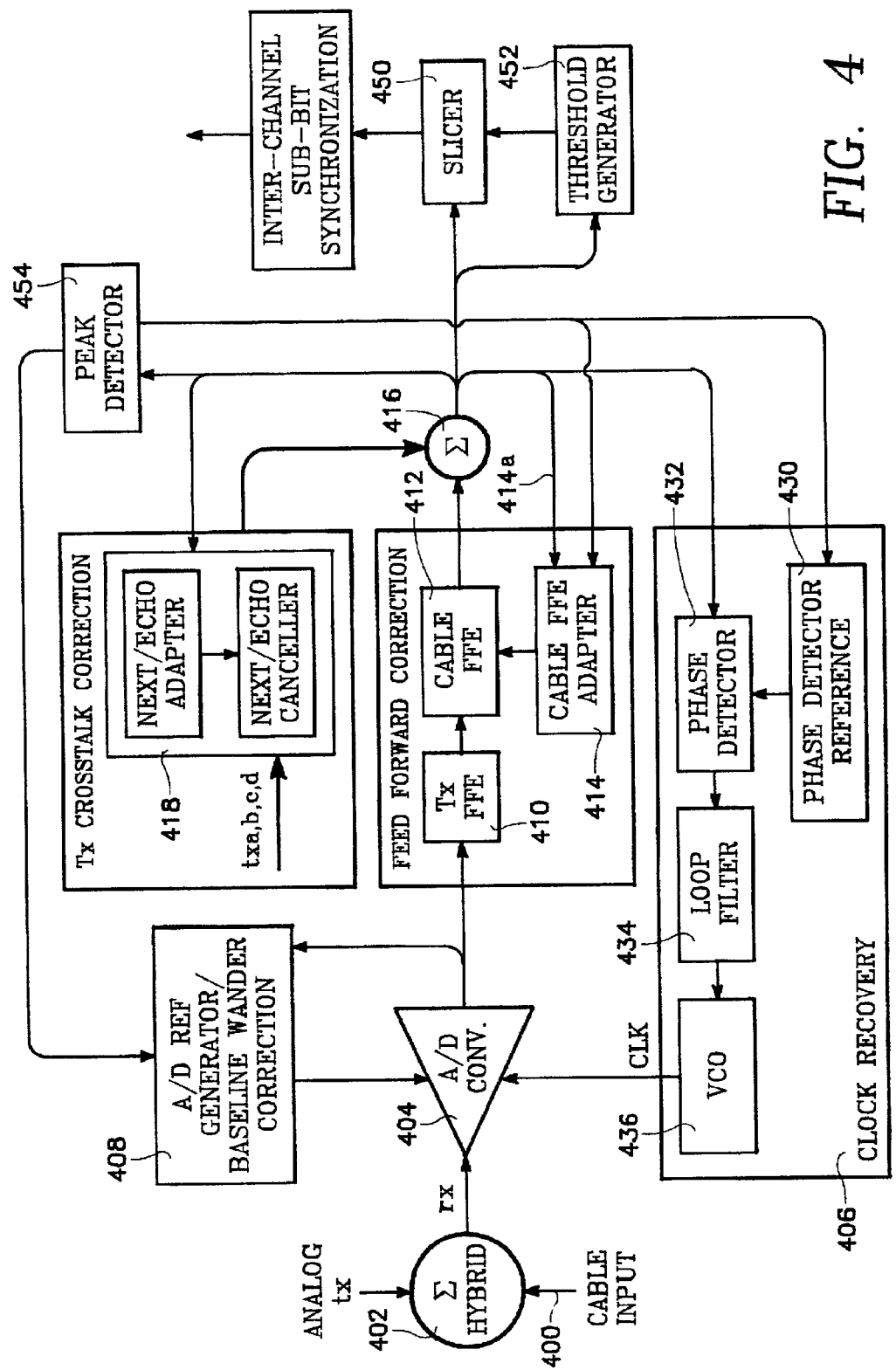
FIG. 4 is a block diagram illustrating a receiver system embodying the present invention.

FIG. 4 illustrates a receiver system embodying the present invention. The receiver system forms a part of a 3-level pulse amplitude modulation gigabit-per-second computer network. In such a system, the same cable (the cable 400 of FIG. 4) carries the transmitted and received signals simultaneously. Therefore, in order to isolate the received signal, an analog subtractor 402 subtracts the analog transmitted signal (the input labeled "analog tx") from the signal on the cable, producing the received signal ("rx") at the output of the subtractor 402. An analog-to-digital converter 404 samples the analog received signal rx in synchronism with a recovered clock signal produced by a clock recovery circuit 406. The analog-to-digital converter 404 converts each analog sample to a digital word (e.g., an eight-bit digital word) in accordance with an analog reference level from a conventional reference generator 408. The digital output of the analog-to-digital converter 404 is processed by a feed-forward equalizer 410 having a transfer function specified in accordance with industry standards to remove a predetermined bias imposed on the signal by the node that transmitted the signal.

In order to compensate for distortions imposed on the received signal during its transit over the cable 400, such as those attributable to reactance of the cable discussed above in this specification, a cable feedforward equalizer 412 imposes a selected transfer function on the signal output by the equalizer 410. The equalizer 412 is of the conventional type whose transfer function may be represented in the complex plane with plural poles and zeroes corresponding to a desired reactance. Preferably, the equalizer stores a number of such transfer functions, one of which may be selected at any one time. A cable feed forward equalizer adapter 414 carries out the function illustrated in FIG. 3 for choosing the best one of the transfer functions or settings of the cable feedforward equalizer 412.

The equalized digital signal produced by the cable feedforward equalizer 412 is combined in an adder 416 with a crosstalk correction signal produced by a crosstalk correction circuit 418. The crosstalk correction circuit 418 produces the crosstalk correction signal so as to compensate or cancel crosstalk from the transmitted signal when combined with the equalized digital signal in the adder 416. The crosstalk correction circuit has two inputs, namely the corrected signal from the output of the adder 416 and the transmitted signal tx, as indicated in FIG. 4. The crosstalk correction circuit 418 consists of a near end crosstalk ("NEXT")/echo canceller 420 and a NEXT/echo adapter 422 that controls the canceller 420. The crosstalk correction circuit 418 including the canceller 420 and the adapter 422 are described in U.S. patent application Ser. No. 09/636,047 entitled "ADAPTER FOR NEAR-END CROSSTALK AND ECHO CANCELLER FOR BI-DIRECTIONAL DIGITAL COMMUNICATIONS" filed Aug. 10, 2000, by Duy Pham et al and U.S. patent application Ser. No. 09/636,042 filed Aug. 10, 2000, by Duy Pham et al, both applications being assigned to the assignee of the present application, the disclosures of which are incorporated herein by reference.

The output of the adder 416 is fed back as an input to the crosstalk correction circuit 418, as referred to above, and to the cable feedforward adapter 414 at feedback input 414a. Referring again to FIG. 3, the receipt of the succession of samples of step 310 refers to the successive digitized samples furnished to the input 414a of the adapter 414. The adapter 414 performs the function illustrated in FIG. 3 so as to maximize the number of digitized samples received at the input 414a falling within the three allowed levels discussed above.

The digital signal output by the adder 416 is also applied as a feedback signal to the clock recovery circuit 406, and specifically to a phase detector 432. The phase detector 432 is described in co-pending commonly assigned U.S. application Ser. No. 09/777,080 filed herewith by Duy Pham et al entitled "PHASE DETECTOR FOR BAUD RATE-SAMPLED MULTI-STATE SIGNAL RECEIVER", the disclosure of which is incorporated herein by reference. The output of the phase detector 432 is applied to the input of a conventional loop filter 434 whose output controls a voltage controlled oscillator 436. The voltage controlled oscillator 436 generates the recovered clock signal applied to the analog-to-digital converter 404. The phase of the voltage controlled oscillator 436 is incremented or decremented depending upon the polarity of the phase error detected by the phase detector 432.

A conventional slicer 450 makes a decision for each digital sample as to which one of the allowed levels the sample represents (i.e., is closest to). It does this in accordance with a conventional threshold generator 452. It should be noted that during the training period of the equalizer adapter 414, 3-level pulse amplitude modulation is employed, but the actual data may be transmitted using a different number of levels, such as 5-level pulse amplitude modulation.

A peak detector 454 determines the prevailing or current peak amplitude (positive and negative) of the digital samples output by the adder 416. The positive and negative peak amplitudes define the upper and lower valid levels of the 3-level signal used during training of the adapter 414. In the example described above, the positive peak was 100, the negative peak was −100, defining the upper and lower valid levels, while the middle level between them was 0. The adapter 414 deduces the three valid levels of the 3-level pulse amplitude modulation signal by assigning the positive peak value sensed by the peak detector 454 to the upper valid level, the negative peak value sensed by the peak detector 454 to the lower valid level and the amplitude midway between the two peaks as the middle valid level. Conventional circuitry is employed to carry out this task, which is part of the step of block 310 of FIG. 3.

The output of the peak detector 454 is also utilized in conventional well-known fashion by the conventional analog-to-digital reference generator 408. The reference generator 408 deduces from the peak magnitudes sensed by the detector 454 the current analog range of the incoming signal, and in conventional manner cause the maximum digital range of the analog-to-digital converter 404 to match the sensed analog range of the incoming signal.

The output of the peak detector 454 is also applied to a phase detector reference circuit 430 of the clock recovery circuit 406. The phase detector reference circuit 430 uses the peak magnitudes sensed by the peak detector 454 to deduce the allowable levels of the digitized signal at the output of the adder 416. The allowable levels thus deduced are then provided to the phase detector 432. The phase detector 432 compares each digital sample received from the adder 416 to the allowable levels provided by the phase detector 430 in order to deduce the current phase error. It does this in the manner described in co-pending commonly assigned U.S. patent application Ser. No. 09/777,080 filed herewith by Duy Pham et al entitled "PHASE DETECTOR FOR BAUD RATE-SAMPLED MULTI-STATE SIGNAL RECEIVER", the disclosure of which is incorporated herein by reference.

Having now described the entire system, the operation of the adapter 414 illustrated in FIG. 3 will now be reviewed with more particular reference to FIG. 4. Initially, and then at periodic intervals thereafter, the adapter 414 determines the optimum equalizer setting of the equalizer 412 during a brief training period. During the training period, it is preferred that the transmitter send a three-level pulse amplitude modulated signal to the receiver in which the three levels consist of positive and negative amplitudes of the same absolute value (e.g., +100) and an intermediate value halfway between these two (e.g., 0). In such a case, the peak detector 454 senses a negative peak value of −100 and a positive peak value of +100, this information being furnished by the peak detector to the adapter 414. As a result, the adapter 414 defines the three valid levels of the received signal as the two peaks (i.e., +100) and the value halfway between them (i.e., 0), in the step of block 310 of FIG. 3. The adapter defines the three regions of valid signal (sample) values corresponding to 10% deviations from each of the valid values, i.e., a top region from 90 and higher, an intermediate region from −10 to +10 and a bottom region from −90 and below. The adapter then selects the first one of the set of equalizer settings of the equalizer 412 (block 320 of FIG. 3), and then simultaneously calculates the whitebox metric in branch 330 of FIG. 3 and the tightness metric of branch 335 of FIG. 3, combines the two metrics to compute the overall metric (block 380) and then selects the next equalizer setting. As described above, these calculations are based upon the population of samples falling within or outside of the valid regions. The samples used in the parallel branches 330 and 335 are the digital words emanating from the output of the adder 416 (not the output of the peak detector 454). The foregoing calculations and equalizer setting changes are repeated again until a metric has been computed for each of the equalizer settings. Then, the equalizer setting having the best metric is selected, and the equalizer 412 is placed in the selected setting. This concludes the training period. Thereafter, actual user data is transmitted to the receiver. The user data may be contained in a 5-level pulse amplitude modulated signal rather than a 3-level signal. The slicer 452 therefore is designed to assign each processed sample value to the closest one of the five allowed signal levels.

The invention is applicable to adapters for various types of multi-level or multi-state signals in which the best one of a plurality of settings of a signal processor, such as an equalizer, is selected by the adapter by evaluating the goodness of each equalizer setting. While the preferred embodiment is useful with pulse amplitude modulated signals, other embodiments may be useful with other types of multi-state modulated signals such as phase modulated signals.

While the invention has been described in detail by specific reference to preferred embodiments, it is understood that variations and modifications thereof may be made without departing from the true spirit and scope of the invention.

What is claimed is:

1. In a receiver that receives a modulated signal having multiple levels and having an equalizer with plural equalization settings for compensating for distortion in the received signal, a method of selecting one of the plural equalization settings that provides an optimum compensation for the distortion, comprising:
(A) for each one of the equalizer settings:
setting the equalizer to the one setting;
defining valid regions encompassing each of the multiple levels of said modulated signal and invalid regions not encompassing the multiple levels;
computing a first metric comprising a count of samples within said invalid regions;
computing a second metric comprising differences less than a predetermined threshold between pairs of samples falling within the same valid region;
combining the first and second metrics to produced a combined metric for said one setting;
(B) choosing the equalizer setting corresponding to the best combined metric.

2. The method of claim 1 wherein said invalid regions lie generally between the valid regions.

3. The method of claim 1 wherein each valid region includes a range of amplitudes within a predetermined fraction of the amplitudes of the corresponding multiple level.

4. The method of claim 1 wherein each invalid region includes a range of amplitudes deviating by more than a predetermined fraction of a peak amplitude from the corresponding multiple level.

5. The method of claim 3 wherein the predetermined threshold corresponds to a fraction less than the predetermined fraction.

6. The method of claim 5 wherein the predetermined fraction corresponds to 10% and the predetermined threshold corresponds to 5%.

7. The method of claim 1 wherein each of the pairs of samples falling within the valid region comprise two samples occurring successively.

8. The method of claim 7 wherein a sample intervening chronologically between the two successive samples but not falling within the same valid region is ignored for purposes of determining successive samples.

9. The method of claim 1 wherein the first metric is a measure of the deviation of samples from valid signal levels of the multistate signal and the second metric is a measure of the consistency of samples about each valid signal level.

10. The method of claim 1 wherein the combined metric is a difference between said first and second metrics.

11. The method of claim 10 wherein the best combined metric is the least positive or most negative metric.

12. The method of claim 1 wherein the combined metric is a ratio between said first and second metrics.

13. The method of claim 1 wherein each equalizer setting corresponds to a different transfer function of the equalizer so as to define a plurality of transfer functions.

14. The method of claim 13 wherein each transfer function of the plurality of transfer function corresponds to a unique set of poles and zeroes corresponding to a particular reactance.

15. The method of claim 1 wherein the step of computing the second metric is carried out for sample pairs in each of the valid regions, the number of differences not exceeding the threshold being summed across all valid regions.

16. A receiver that receives a modulated signal having multiple levels, said receiver comprising:

an equalizer with plural equalization settings for compensating for distortion in the received signal; and an adapter for selecting one of the plural equalization settings that provides an optimum compensation for the distortion at the output of the equalizer, said adapter comprising:

means for setting the equalizer to the one setting;

means for defining valid regions encompassing each of the multiple levels of said modulated signal and invalid regions not encompassing the multiple levels;

means for computing a first metric comprising a count of samples within said invalid regions;

means for computing a second metric comprising differences less than a predetermined threshold between pairs of samples falling within the same valid region;

means for combining the first and second metrics to produced a combined metric for said one setting and choosing the equalizer setting corresponding to the best combined metric.

17. The receiver of claim 16 wherein said invalid regions lie generally between the valid regions.

18. The receiver of claim 16 wherein each valid region includes a range of amplitudes within a predetermined fraction of the amplitudes of the corresponding multiple level.

19. The receiver of claim 16 wherein each invalid region includes a range of amplitudes deviating by more than a predetermined fraction of a peak amplitude from the corresponding multiple level.

20. The receiver of claim 18 wherein the predetermined threshold corresponds to a fraction less than the predetermined fraction.

21. The receiver of claim 20 wherein the predetermined fraction corresponds to 10% and the predetermined threshold corresponds to 5%.

22. The receiver of claim 16 wherein each of the pairs of samples falling within the valid region comprise two samples occurring successively.

23. The receiver of claim 22 wherein a sample intervening chronologically between the two successive samples but not falling within the same valid region is ignored for purposes of determining successive samples.

24. The receiver of claim 16 wherein the first metric is a measure of the deviation of samples from valid signal levels of the multistate signal and the second metric is a measure of the consistency of samples about each valid signal level.

25. The receiver of claim 16 wherein the combined metric is a difference between said first and second metrics.

26. The receiver of claim 25 wherein the best combined metric is the least positive or most negative metric.

27. The receiver of claim 16 wherein the combined metric is a ratio between said first and second metrics.

28. The receiver of claim 16 wherein each equalizer setting corresponds to a different transfer function of the equalizer.

29. The receiver of claim 28 wherein each transfer function corresponds to a unique set of poles and zeroes corresponding to a particular reactance.

* * * * *